United States Patent
Yamada et al.

(10) Patent No.: US 7,000,749 B2
(45) Date of Patent: Feb. 21, 2006

(54) RATCHET ONE-WAY CLUTCH, AND STATOR APPARATUS USING THE SAME

(75) Inventors: Takaya Yamada, Kakegawa (JP); Kazuhiko Muramatsu, Fukuroi (JP); Shinji Matsuura, Kakegawa (JP)

(73) Assignee: NSK-Warner K. K., Tokyo (JP)

( * ) Notice: Subject to any disclaimer, the term of this patent is extended or adjusted under 35 U.S.C. 154(b) by 0 days.

(21) Appl. No.: 10/357,413

(22) Filed: Feb. 4, 2003

(65) Prior Publication Data

US 2003/0146063 A1   Aug. 7, 2003

(30) Foreign Application Priority Data

Feb. 7, 2002   (JP)   .............. 2002-030293

(51) Int. Cl.
*F16D 41/12*   (2006.01)

(52) U.S. Cl. .............. 192/46; 60/345; 192/55.61

(58) Field of Classification Search .......... 192/46, 192/110 B, 55.61, 55.6; 60/345; 188/82.7, 188/82.77
See application file for complete search history.

(56) References Cited

U.S. PATENT DOCUMENTS

| | | | |
|---|---|---|---|
| 2,082,129 A * | 6/1937 | Ranst ................... 192/48.3 |
| 3,695,405 A * | 10/1972 | Maucher et al. ........... 192/214 |
| 3,886,740 A * | 6/1975 | Krok ....................... 60/341 |
| 4,232,534 A * | 11/1980 | Lamarche ................. 464/68 |
| 4,620,621 A * | 11/1986 | Kulczycki et al. ......... 192/3.31 |
| 4,667,801 A * | 5/1987 | Fischer et al. ............. 192/214 |
| 4,841,615 A * | 6/1989 | Ratner ..................... 29/889.5 |
| 5,125,487 A * | 6/1992 | Hodge ..................... 60/345 |
| 5,334,112 A * | 8/1994 | Nogle et al. .............. 475/59 |
| 5,769,196 A * | 6/1998 | Murata .................... 192/3.29 |
| 5,899,311 A | 5/1999 | Yamamoto et al. ......... 192/205 |
| 6,338,403 B1 * | 1/2002 | Costin et al. .............. 192/46 |
| 6,557,681 B1 * | 5/2003 | Kinoshita et al. ........... 192/46 |
| 6,568,180 B1 * | 5/2003 | Maeda et al. .............. 60/345 |
| 2002/0005326 A1 * | 1/2002 | Muramatsu ................ 192/46 |
| 2002/0005327 A1 * | 1/2002 | Muramatsu et al. ......... 192/46 |
| 2002/0056274 A1 * | 5/2002 | Yamamoto et al. .......... 60/339 |
| 2002/0180288 A1 * | 12/2002 | Muramatsu et al. ......... 310/90 |

FOREIGN PATENT DOCUMENTS

| JP | 10-61747 | | 3/1998 |
|---|---|---|---|
| JP | 11-2303 A | * | 1/1999 |
| JP | 2002-13559 | | 1/2002 |

* cited by examiner

*Primary Examiner*—Rodney H. Bonck
(74) *Attorney, Agent, or Firm*—Miles & Stockbridge PC (57) ABSTRACT

In a ratchet one-way clutch including an inner race, an outer race provided coaxially with the inner race, a pawl member for transmitting torque between the inner race and the outer race, and a damper mechanism for absorbing shock at the time of engagement of the pawl member, a sliding plate is interposed between two members which constitute the damper mechanism and are rotatable relative to each other.

15 Claims, 11 Drawing Sheets

RATCHET ONE-WAY CLUTCH, AND STATOR APPARATUS USING THE SAME

BACKGROUND OF THE INVENTION

1. Field of the Invention

The present invention relates to a transmission for use in cars, agricultural machines, construction machines, industrial machines, and the like. More particularly, the invention relates to a ratchet one-way clutch using a ratchet (a pawl member) as a lock mechanism, which is a type of one-way clutches with functions of backstop and the like, and can be used in automatic transmissions of vehicles, and the like, and a stator apparatus using such a ratchet one-way clutch.

2. Related Background Art

A one-way clutch for use in automatic transmissions generally includes an inner race, an outer race relatively rotatable to the inner race, and a sprag or roller for transmitting torque between the inner and outer races. Upon engagement of the sprag or roller with a raceway surface of the inner race or outer race, or a cam surface formed on the raceway surface, rotating torque is transmitted in one direction only. Idling between the outer and inner races occurs in the opposite direction.

Among those one-way clutches, there is a ratchet one-way clutch using a ratchet as a torque transmitting member for transmitting torque between outer and inner races. The ratchet one-way clutch includes an outer race having a pocket on its inner periphery, an inner race disposed coaxially with the outer race and having a notch on its outer periphery, a pawl member contained in the pocket, and, when meshed with the notch of the inner race, bringing the one-way clutch into a locked condition to transmit torque between the outer and inner races, and an elastic member, such as a spring, for biasing the pawl member toward the inner race.

In the above-discussed ratchet one-way clutch, when the clutch is under the condition of rotation in one direction, the pawl member freely slides on the outer periphery of the inner race to cause a relative idling between the inner and outer races. Upon rotation of the one-way clutch in the opposite direction, the pawl member meshes with the notch to bring the clutch into a lock-up condition.

Figure 12:
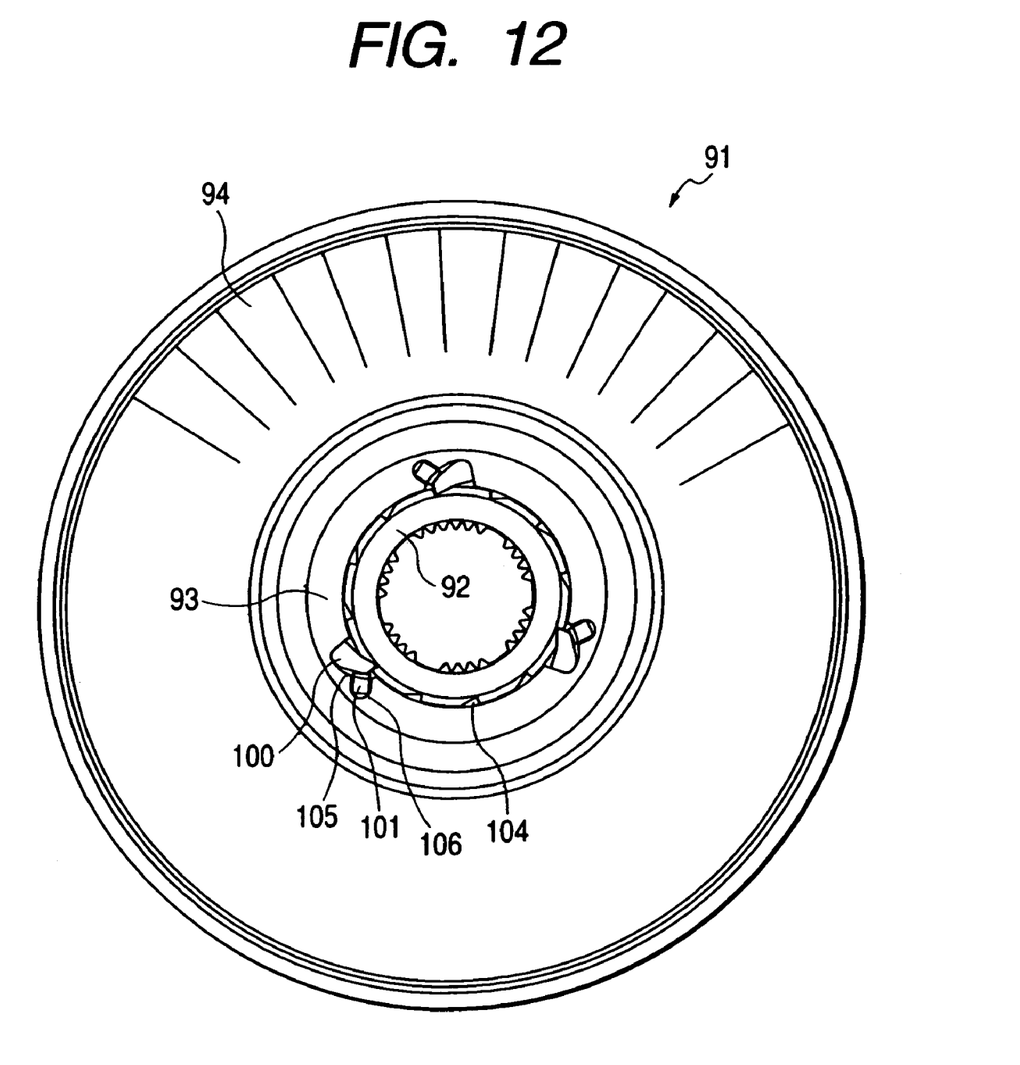
FIG. 12 is a front-side cross-sectional view illustrating another conventional ratchet one-way clutch.
Figure 13:
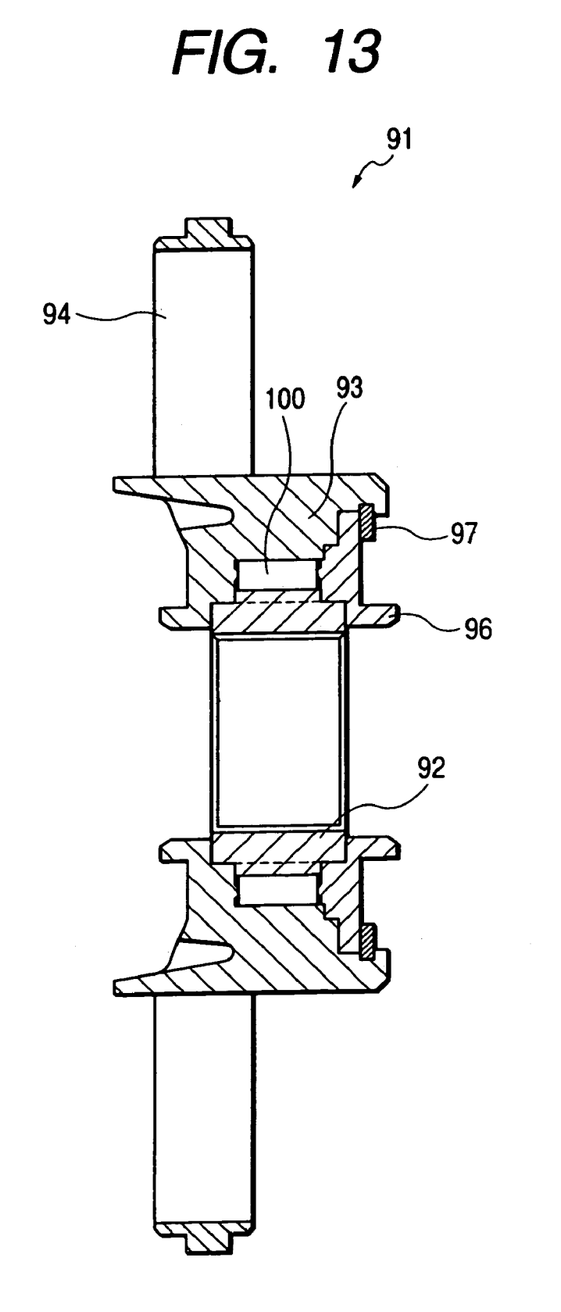
FIG. 13 is an axially-sectional view of FIG. 12.

FIGS. 12 and 13 illustrate a conventional ratchet one-way clutch used in a stator of a torque converter 91. FIG. 12 is a front-side cross-sectional view of the ratchet one-way clutch, and FIG. 13 is an axial cross-sectional view of FIG. 12.

The torque converter 91 includes an stator impeller 94 having an outer race portion 93 on its inner periphery, an inner race 92 having recesses 104 on its outer periphery and disposed coaxially with the outer race portion 93, a pawl member 100 contained in a pocket 105 formed on the inner periphery of the outer race portion 93 to transmit torque upon engagement with the recess 104, a basing member 101 disposed in an indent 106 formed in the pocket 105 to bias the pawl member 100 in a radially-inward direction, a bush 96 slidably arranged on the inner race 92 to support the pawl member 100 and the biasing member 101 along an axial direction, and a snap-ring 97 for preventing the bush 96 from slipping off. A wave spring is mainly used as the biasing member 101.

When the ratchet one-way clutch is used in the stator as in the above-discussed conventional structure, abnormal noises are likely to occur due to the backlash at the time of engagement between the pawl member and the recess. A damper structure is accordingly considered to prevent the occurrence of abnormal noises.

Figure 10:
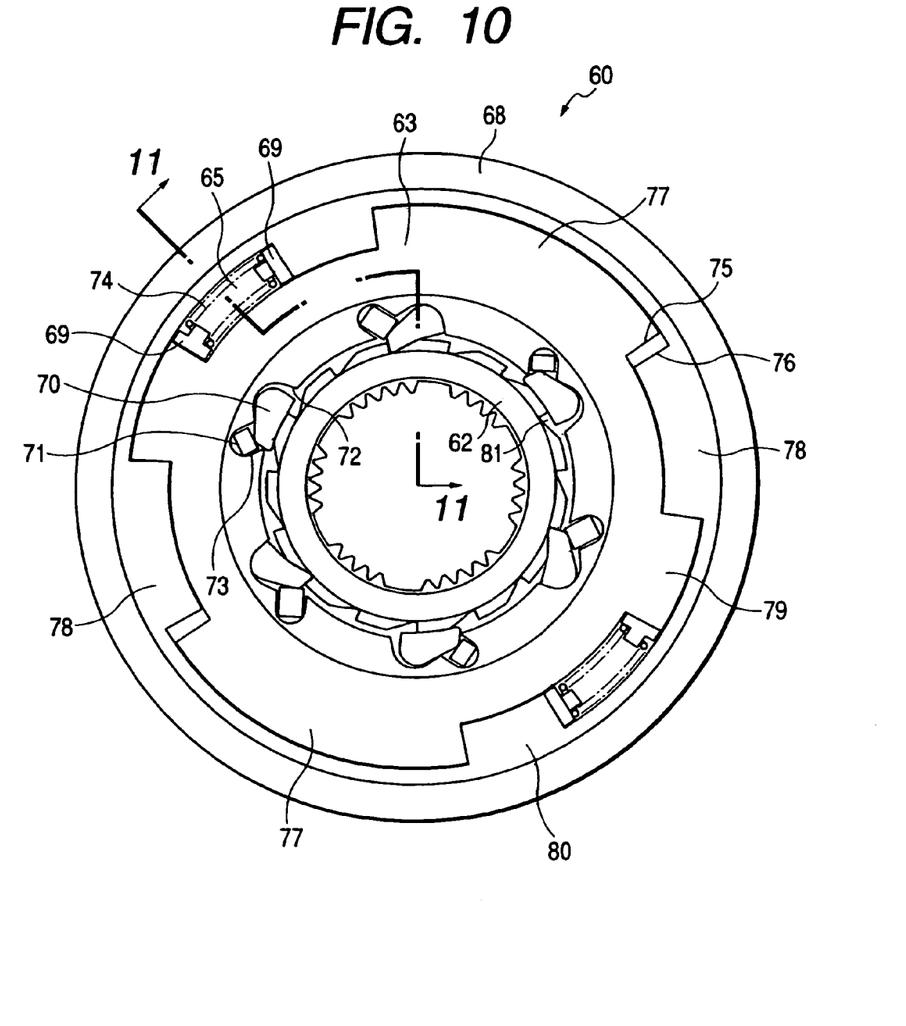
FIG. 10 is a front-side cross-sectional view illustrating a conventional ratchet one-way clutch.
Figure 11:
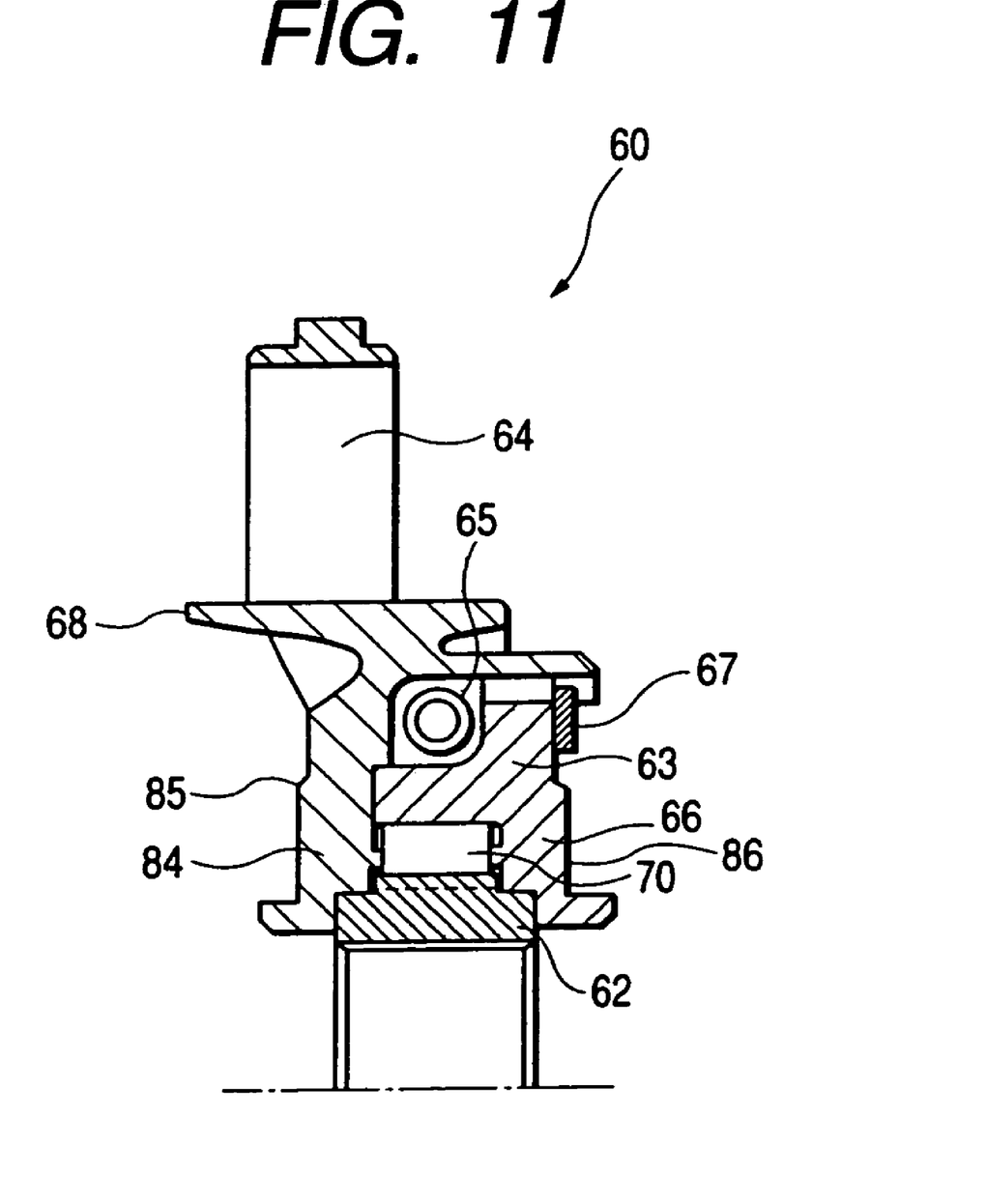
FIG. 11 is a cross-sectional view taken along the line 11—11 in FIG. 10.

FIGS. 10 and 11 illustrate another conventional ratchet one-way clutch disclosed in Japanese Patent Application Laid-Open No. 2002-13559. FIG. 10 is a front-side cross-sectional view of this conventional clutch used in a stator 60, and FIG. 11 is a cross-sectional view taken along a line 11—11 in FIG. 10.

As illustrated in FIG. 10, the stator 60 includes an inner race 62 having recesses 81 on its outer periphery, an outer race member 63 provided coaxially with the inner race 62 and having pockets 72 and indents 73 on its inner periphery, a pawl member 70 contained in the pocket 72 such that torque can be transmitted between the inner race 62 and the outer race member 63 when engaged with the recess 81, a biasing member 71 arranged in the indent 73 to aid the pawl member 70 to mesh with the recess 81, an operating member 68 rotatable relative to the outer race member 63, a spring 65 disposed in a space 74 formed between the outer race member 63 and the operating member 68, and sheet members 69 placed at opposite ends of the spring 65.

A pair of portions 77 protruding in a radially-outward direction are formed on diametrically-opposite portions of the outer periphery of the outer race member 63, respectively. Further, a pair of portions 78 protruding in a radially-inward direction are formed on diametrically-opposite portions of the inner periphery of the operating member 68 disposed outside the outer race member 63, respectively. End faces 75 and 76 of the protruding portions 77 and 78 are opposed to each other with a predetermined clearance therebetween.

In addition, a pair of protruding portions 79 with a circumferential length shorter than that of the protruding portion 77 are diametrically formed between the protruding portions 77 of the outer race member 63. A pair of protruding portions 80 with a circumferential length shorter than that of the protruding portion 78 are diametrically formed between the protruding portions 78 of the operating member 68. The above space 74 is a circumferential clearance between end faces of the protruding portions 79 and 80, in which the spring 65 is sandwiched between the sheet members 69.

As illustrated in FIG. 11, the outer race member 63 has an annular extension portion 66 extending in a radially-inward direction. The extension portion 66 supports the pawl member 70 and the biasing member 71, and acts as a bush sliding on outer periphery and side of the inner race 62. In the stator 60, side surfaces 85 and 86 of a radially-inner portion 84 in the operating member 68 and the outer race member 63 act as a receiving surface for a needle bearing (not shown). A snap-ring 67 prevents the outer race member 63 from slipping off. A reference numeral 64 denotes a stator impeller.

In the ratchet one-way clutch as illustrated in FIGS. 12 and 13, however, recesses for engaging with the pawl member are arranged with a predetermined pitch along a circumferential direction of the race. Accordingly, when the rotational direction changes from an idling direction to a meshing direction, the backward movement of the pawl member within an amount of the predetermined pitch occurs before the pawl member meshes with the recess.

The above-discussed engagement between the pawl member and the recess inevitably accompanies shock and noises due to the shock. Accordingly, it is considered that the outer race and the stator impeller are assembled in a relatively-rotatable manner and a damper spring for forming the damper mechanism is interposed between the outer race and the stator impeller, such that the shock can be alleviated and the occurrence of noises can be prevented.

A fluid oil pressure, however, appears when the stator impeller rotates in a torque converter, and the outer race and the stator impeller are likely to be pressed against each other in an axial direction. Thus, the relative rotation between the outer race and the impeller required by the damper mechanism is inhibited or weakened, resulting in undesired wear and occurrence of much wear powder. Where the outer race and the stator impeller are made of aluminum, which is adopted in an embodiment of the present invention described later, the above problem is more likely to arise since a sliding contact is effected between the same material of aluminum.

Further, when it is considered that stress is dispersed to maintain the strength of the outer race, it is preferable to replace angled corner portions in the contour of the pocket by arcuate portions as much as possible. On the other hand, the biasing spring disposed in the pocket is formed of steel, and the hardness of the spring is hence greater than that of the outer race. Therefore, the biasing spring rattles in the pocket due to incessant up-and-down movements of the pawl member at the time of idling and vibrations transmitted from the driving shaft and the like, resulting in wear of the outer race where the spring is in contact with the outer race. In particular, when the biasing spring is an accordion-type spring, an angled portion of the spring is brought into a linear contact with an arcuate inner wall of the pocket. Accordingly, the condition of the spring in the pocket becomes more unstable, and the wear resultantly increases.

Furthermore, the stator undergoes a fluid pressure in the torque converter, and the outer race member is hence pressed against the stator wheel (stator impeller). Therefore, when the damper mechanism operates, the outer race member and the stator wheel are subjected to the wear to impair a smooth relative rotation, similar to the conventional apparatus of FIGS. 12 and 13. This situation goes worse because of fusion or melting of material when both of the outer race member and the stator wheel are formed of aluminum.

It is an object of the present invention to achieve a smooth relative rotation between two members of a damper mechanism, suppress wear due to a sliding motion and occurrence of wear powder due to the wear, stabilize the operation of a spring used as a biasing member, and suppress wear due to a rattling movement of the spring and occurrence of wear powder due to the wear.

It is another object of the present invention to achieve a smooth operation of a damper mechanism in a stator.

It is another object of the present invention to provide a ratchet one-way clutch which includes an inner race, an outer race provided coaxially with the inner race, a pawl member for transmitting torque between the inner race and the outer race, and a damper mechanism for absorbing shock at the time of engagement of the pawl member, and in which a sliding plate is interposed between two members that constitute the damper mechanism and are rotatable relatively to each other.

It is another object of the present invention to provide a ratchet one-way clutch which includes an inner race, an outer race provided coaxially with the inner race, a torque transmitting member disposed in either of the inner race and the outer race, and a biasing member for biasing the torque transmitting member, and in which a protecting member is interposed between the biasing member and one of the inner race and the outer race wherein the torque transmitting member is provided.

It is still another object of the present invention to provide a stator apparatus which includes an outer race member of a one-way clutch assembly, a stator wheel rotatable relative to the outer race member, and a damper mechanism, and in which an extension portion extending in an axial direction is formed in one of the outer race member and the stator wheel, a window corresponding to the extension portion is formed in the other of the outer race member and the stator wheel, the extension portion extends through the window to provide a protruding portion on the side of a side surface of the other of the outer race member and the stator wheel, and the protruding portion of the extension portion is supported by a bearing.

SUMMARY OF THE INVENTION

In order to attain the above objects, the present invention provides a ratchet one-way clutch which includes an inner race, an outer race provided coaxially with the inner race, a pawl member for transmitting torque between the outer race and the inner race, and a damper mechanism for absorbing shock at the time of engagement of the pawl member, and in which a sliding plate is interposed between two members that constitute the damper mechanism and are rotatable relative to each other.

Further, the present invention provides a ratchet one-way clutch which includes an inner race, an outer race provided coaxially with the inner race, a torque transmitting member disposed in either of the outer race and the inner race, and a biasing member for biasing the torque transmitting member, and in which a protecting member is interposed between the biasing member and one of the outer race and the inner race wherein the torque transmitting member is provided.

The protecting member can be a piece portion formed in the sliding plate interposed between two members that constitute the damper mechanism and are rotatable relative to each other. Further, the sliding plate can be provided with a support portion for supporting the pawl member.

Further, the present invention provides a stator apparatus using the ratchet one-way clutch described above.

The two relatively-rotatable members can be an outer race of the ratchet one-way clutch and a stator impeller, respectively. Further, the outer race and the impeller can be formed of aluminum, and the sliding plate can be formed of steel.

Further, the present invention provides a stator apparatus which includes an outer race member of a one-way clutch, a stator wheel rotatable relative to the outer race member, and a damper mechanism, and in which an extension portion extending in an axial direction is formed in one of the outer race member and the stator wheel, a window corresponding to the extension portion is formed in the other of the outer race member and the stator wheel, the extension portion extends through the window to provide a protruding portion on the side of a side surface of the other of the outer race member and the stator wheel, and the protruding portion of the extension portion is supported by a bearing.

Further, the present invention provides a stator apparatus which includes an outer race member of a one-way clutch, a stator wheel rotatable relative to the outer race member, and a damper mechanism, and in which a bearing member is interposed between the outer race member and the stator wheel.

The bearing member can be a rolling bearing.

Further, the present invention provides a stator apparatus which includes an outer race member of a one-way clutch, a stator wheel rotatable relative to the outer race member, and a damper mechanism, and in which the outer race member and a bush are adjacently arranged along an axial direction, and the stator wheel is disposed on outer peripheries of the outer race member and the bush.

The one-way clutch assembly can be a ratchet one-way clutch. Further, the outer race member and the stator wheel can be made of aluminum.

More specifically, the inner race and the outer race can be coaxially assembled, a recess for engagement with the pawl member can be formed on the outer periphery of the inner race, and a pocket can be formed on the inner periphery of the outer race to contain a pawl member and an accordion-type spring for biasing the pawl member within the pocket. The outer race and a radially-inner portion of the stator impeller can be provided with separated portions, respectively, the outer race of the ratchet one-way clutch and the stator impeller can be assembled in a relatively-rotatable manner as discussed above, a damper spring can be interposed therebetween to constitute the damper mechanism. The outer race and the stator impeller can be made of aluminum. A sliding plate formed of steel can be interposed between the outer race and the stator impeller. Further, the sliding plate can be provided with a protecting piece arranged between the accordion spring and the pocket.

An extension portion can be formed in the outer race member, and a window can be formed in a radially-inner portion of the stator wheel. The extension portion can extend through the window to provide a portion protruding to the opposite side of the stator wheel, and the protruding portion can be supported by a needle bearing.

Other features, benefits and advantages of the present invention will become apparent from the following description of the invention, when viewed in accordance with the attached drawings and appended claims.

DESCRIPTION OF THE PREFERRED EMBODIMENTS

Description will now be made to preferred embodiments of the present invention with reference to the accompanying drawings. In the drawings, portions or members with the same or similar functions are denoted by the same reference numerals.

(First Embodiment)

Figure 1:
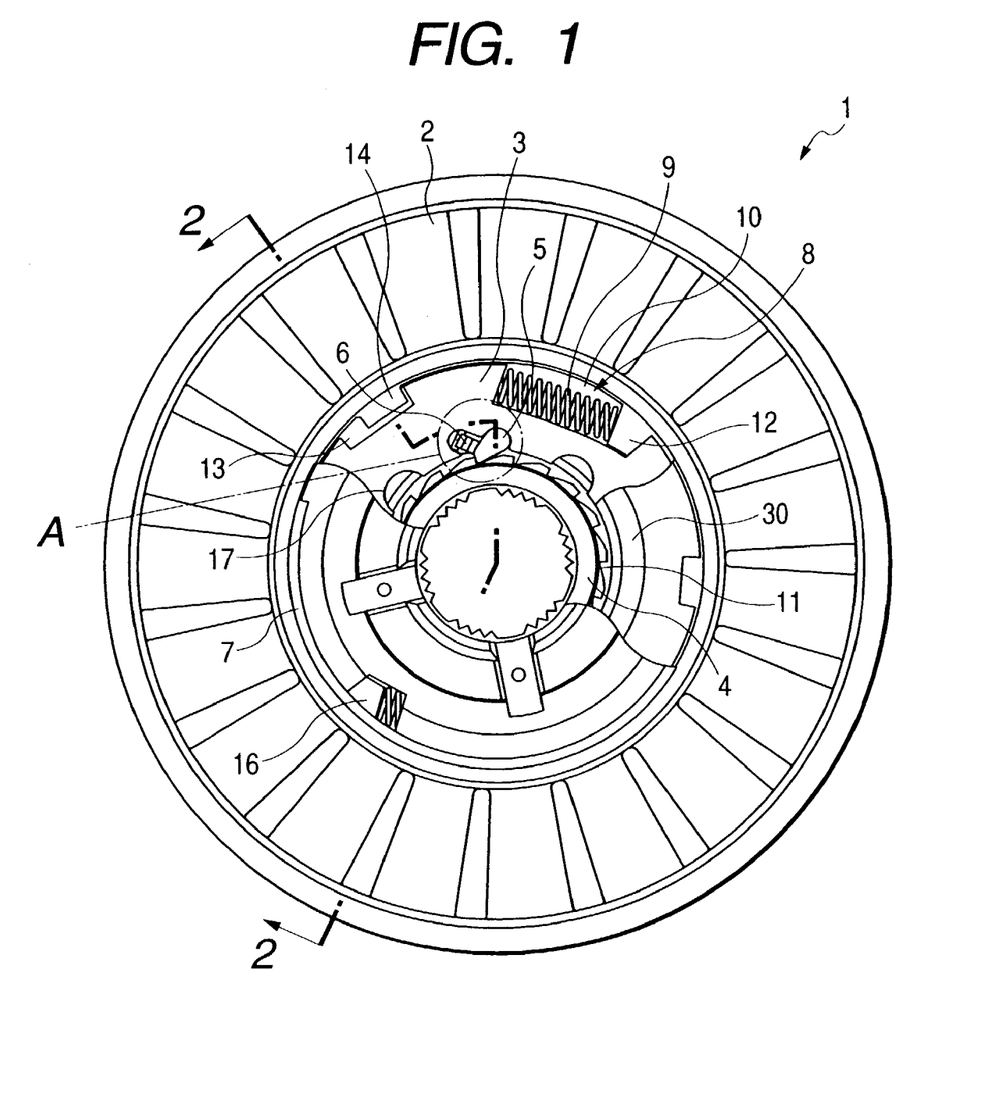
FIG. 1 is a partially-sectional view viewed along the direction of an arrow B in FIG. 2, and illustrating a first embodiment of the present invention directed to a ratchet one-way clutch assembly used in a stator apparatus.
Figure 2:
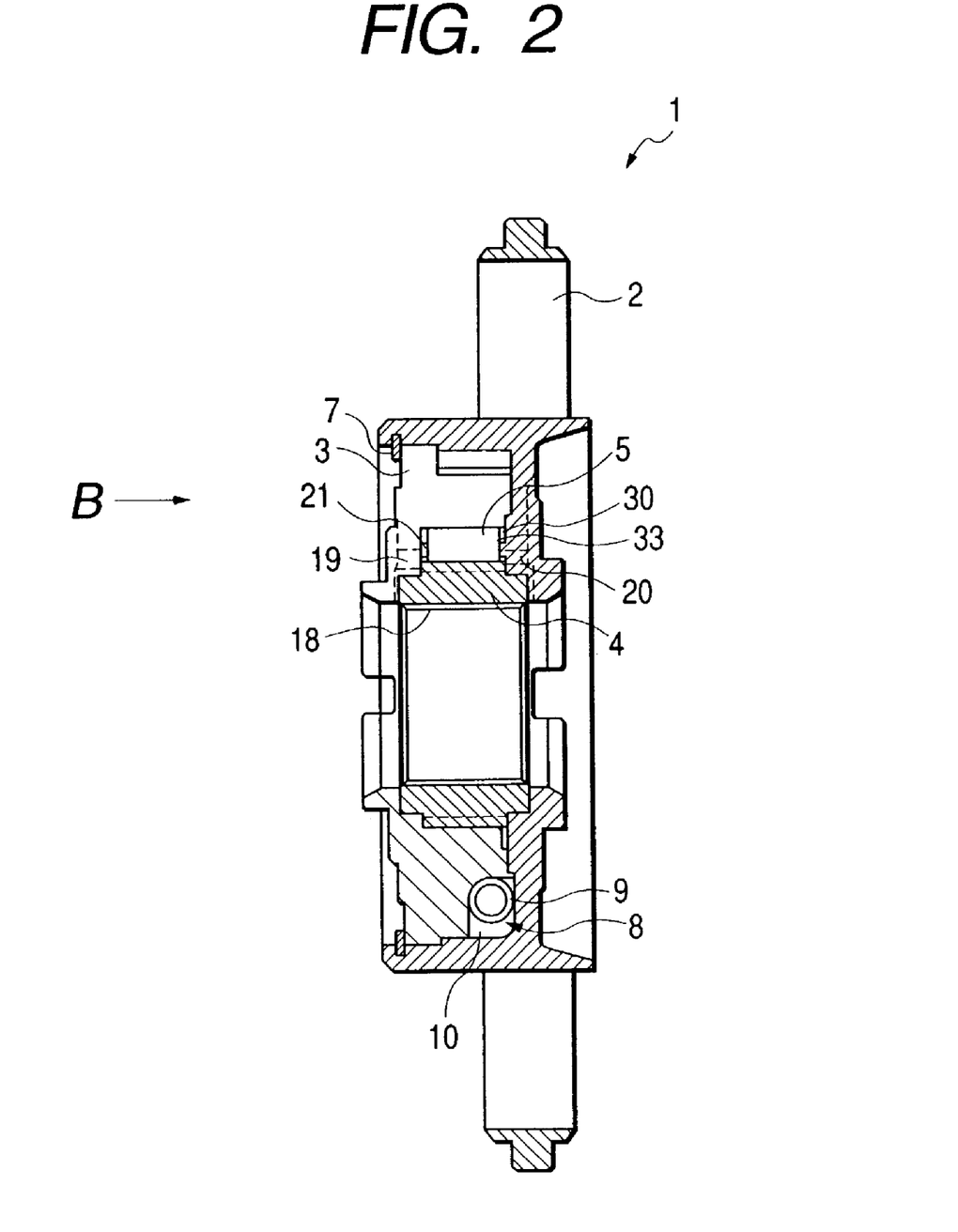
FIG. 2 is a cross-sectional view taken along a line 2—2 in FIG. 1.

FIGS. 1 and 2 illustrate a first embodiment of the present invention, respectively. FIG. 1 is a partially-sectional view viewed along the direction of arrow B in FIG. 2, and illustrating a stator apparatus using a ratchet one-way clutch assembly of the first embodiment, and FIG. 2 is a cross-sectional view taken along the line 2—2 in FIG. 1.

The ratchet one-way clutch assembly, which is used in a stator apparatus 1 of a torque converter (not shown) for use in automatic transmissions of vehicles, includes an inner race 4, an outer race 3 provided coaxially with and rotatably relative to the inner race 4 on its outer periphery, pawls 5 arranged on the inner periphery of the outer race 3 to transmit torque between the inner race 4 and the outer race 3, accordion springs 6 for biasing the pawls 5 in a radially-inward direction, respectively, and a stator impeller 2 having on its radially-inner portion an approximately cylindrical portion disposed opposingly to side and outer peripheral surfaces of the outer race 3.

A plurality of recesses or step portions 11 are equidistantly formed along the circumferential direction on the outer periphery of the inner race 4, and a plurality of first pockets 25 (see FIG. 3) are equidistantly formed along the circumferential direction on the inner periphery of the outer race 3. Further, grooved portions 17 are formed between the first pockets 25 of the outer race 3 along the circumferential direction, respectively. The grooved portion 17 has functions of relieving stress that occurs at the time of engagement between the pawl 5 and the recess 11, and the like.

A damper mechanism 8 has the following structure. The outer race 3 and the stator impeller 2 are separately constructed, and rotatable relative to each other. A range of the relative rotation between the outer race 3 and the stator impeller 2 is defined by a range over which a protruding portion 14 formed on the inner periphery of the stator impeller 2 can move within a recessed portion 13 formed on the outer periphery of the outer race 3. A damper spring 9 is disposed in a pocket formed on the outer periphery of the outer race 3.

One end of the damper spring 9 in the pocket 10 is supported by a receiving portion 12 or 16 formed in a radially-inner portion of the stator impeller 2, and the other end of the damper spring 9 is supported by an inner wall portion defining the pocket 10 of the outer race 3. A sliding plate 30 is interposed between two relatively-rotatable members, i.e., the outer race 3 and the radially-inner portion of the impeller 2. Due to such a structure, shock can be absorbed by the damper spring 9 the moment the pawl 5 engages with the recess 11. During this operation, an excessive contraction of the damper spring 9 is prevented by the mechanism for limiting the range of the above-discussed relative rotation, so that fatigue and destruction of the damper spring 9 can be avoided. Further, the sliding plate 30 can effect a smooth relative rotation between the outer race 3 and the impeller 2.

As illustrated in FIG. 2, the outer race 3 is axially retained under an approximately fixed condition by an annular retainer 7 fitted into a radially-inner portion of the stator impeller 2. A spline 18 is circumferentially formed on a radially-inner wall of the inner race 4 such that the inner race 4 can be spline-coupled to a shaft (not shown). An axially-projecting portion 21 is formed on an innermost portion of the first pocket 25 of the outer race 3. Further, an axially-projecting support portion 33 is formed on an axially-inner surface of the sliding plate 30, opposed to the projecting portion 21. Axially-through holes 19 and 20 are formed in the outer race 3 and the stator impeller 2, respectively, such that a passage of lubricant for lubricating the ratchet one-way clutch can be established. In this embodiment, the sliding plate 30 is formed of steel, but this sliding plate can be replaced by any of a variety of sliding bearings formed of resin, brass, phosphor bronze, and the like.

In the above-discussed structure, axial end faces of the pawl 5 are supported by the projecting portion 21 of the outer race 3 and the support portion 33 of the sliding plate 30. Accordingly, the pawl 5 can move stably in the first pocket 25, and can be prevented from rattling violently in the first pocket 25. Shapes of the projecting portion 21 and the support portion 33 are preferably annular.

Figure 3:
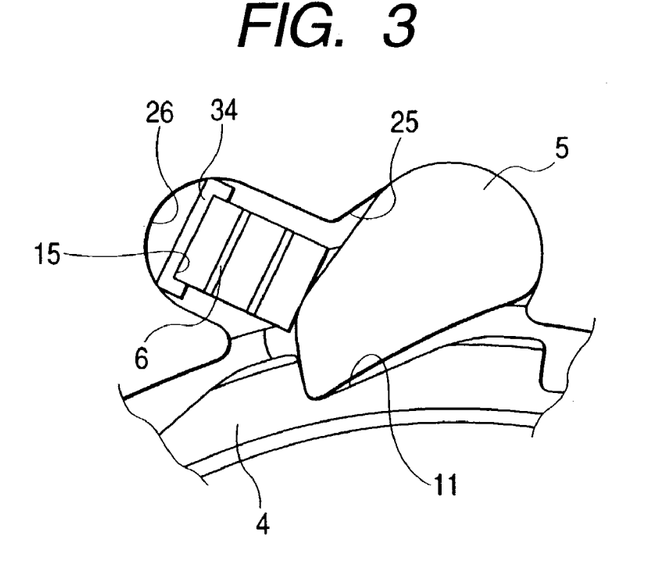
FIG. 3 is an enlarged view of a portion A shown in FIG. 1.

FIG. 3 is an enlarged view of the portion A in FIG. 1. As illustrated in FIG. 3, a second pocket 26 is formed continuously to the first pocket 25 formed in the radially-inner portion of the outer race 3. While the pawl 5 for transmitting torque between the outer race 3 and the inner race 4 is disposed in the first pocket 25, the second pocket 26 contains the accordion spring 6 for biasing the pawl 5 toward engagement with the recess 11 formed in the inner race 11.

A protecting member 34 for protecting the end portion of the accordion spring 6 is interposed between the spring 6 and the inner wall of the second pocket 26. In such a structure, the accordion spring 6 does not rub against the inner wall of the second pocket 26, even when the inner race 4 rotates in a counterclockwise direction relative to the outer race 3, and effects a continuous up-and-down movement of the pawl 5 along the recesses 11 formed on the outer periphery of the inner race 4. This is because the protecting member 34 protects the outer race 3 from the according spring 6. Particularly, the protecting member 34 can prevent angled portions 15 of the accordion spring 6 from contacting the inner wall of the second pocket 26. Therefore, wear of the second pocket 26 of the outer race 3 and portions adjacent thereto can be reduced.

(Second Embodiment)

Figure 4:
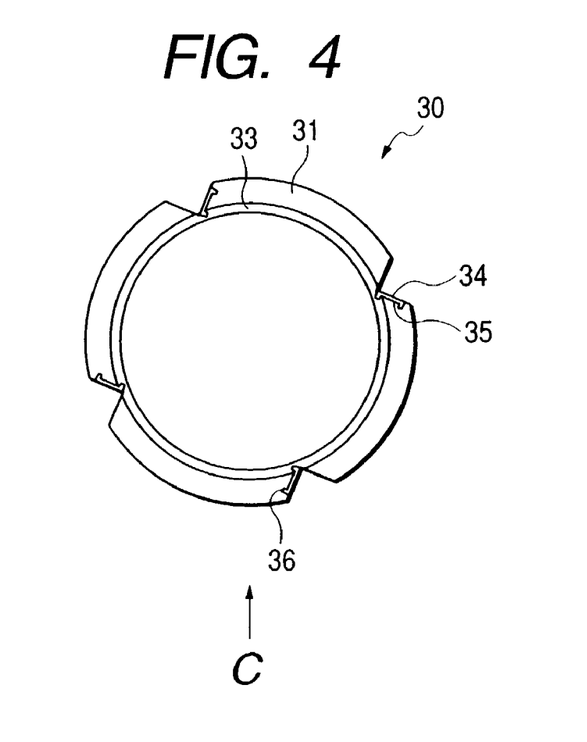
FIG. 4 is a front view illustrating a sliding plate used in a second embodiment of the present invention, and viewed along the direction of the arrow B in FIG. 2.
Figure 5:
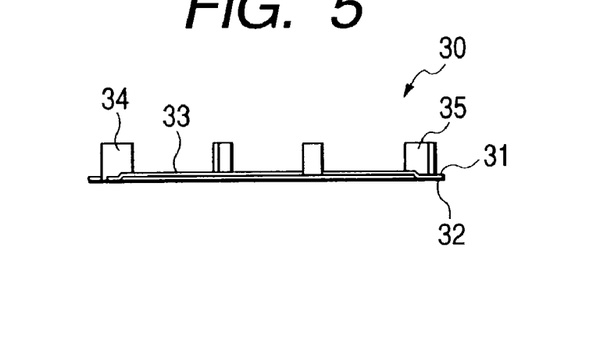
FIG. 5 is a side view illustrating the sliding plate used in the second embodiment, and viewed along the direction of an arrow C in FIG. 4.

FIGS. 4 and 5 illustrate a second embodiment, and are front view and side view of a sliding plate 30, respectively. FIG. 4 is a front view viewed along the direction of the arrow B in FIG. 2, and FIG. 5 is a side view viewed along the direction of an arrow C in FIG. 4. The sliding plate 30 is stamped from a planar plate. The sliding plate 30 includes a first sliding surface 31 for sliding on the side surface of the outer race 3, and a second sliding surface 32 for sliding on the side surface of a radially-inner portion of the stator impeller 2. The first sliding surface 31 and the second sliding surface 32 are on axially-opposite sides, respectively.

The sliding plate 30 is further provided with an annular support portion 33 that projects in an axial direction for axial positioning of the pawl 5. The support portion 33 supports a portion of the pawl 5 near its rotational center only, but not the entire side of the pawl 5. Accordingly, resistance to the operative movement of the pawl 5 is lowered. Furthermore, the sliding plate 30 is provided with four protecting portions 34 formed by cutting and erecting these portions. The protecting portion 34 has folded portions 36 on its opposite sides. A portion between the folded portions 36 acts as a receiving face 35 for receiving the end face of the accordion spring 6, and these folded portions 36 support the angled portions 15 of the spring 6.

The protecting portion 34 for protecting the end portion of the accordion spring 6 is formed as an integral part of the sliding plate 30 in the second embodiment, while the protecting member 34 is formed as a separate member in the first embodiment. In the second embodiment, therefore, the number of components can be reduced, and a stable function of the protecting portion 34 can be obtained. In both of the first embodiment and the second embodiment, the outer race 3 and the stator impeller 2 are made of aluminum, and the sliding plate is formed of steel.

(Third Embodiment)

Figure 6:
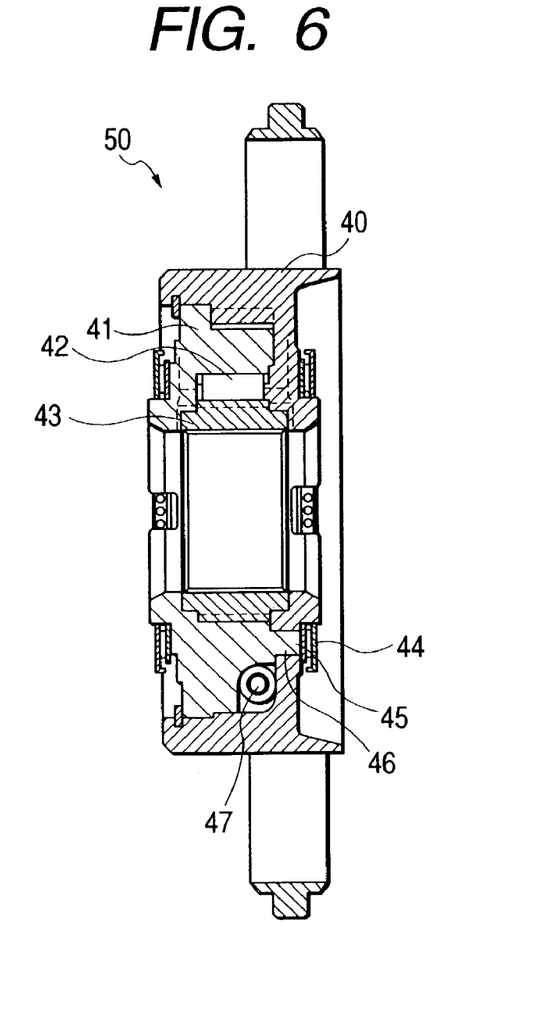
FIG. 6 is a cross-sectional view taken along a line 6—6 in FIG. 7, and illustrating a third embodiment of the present invention directed to a stator apparatus.
Figure 7:
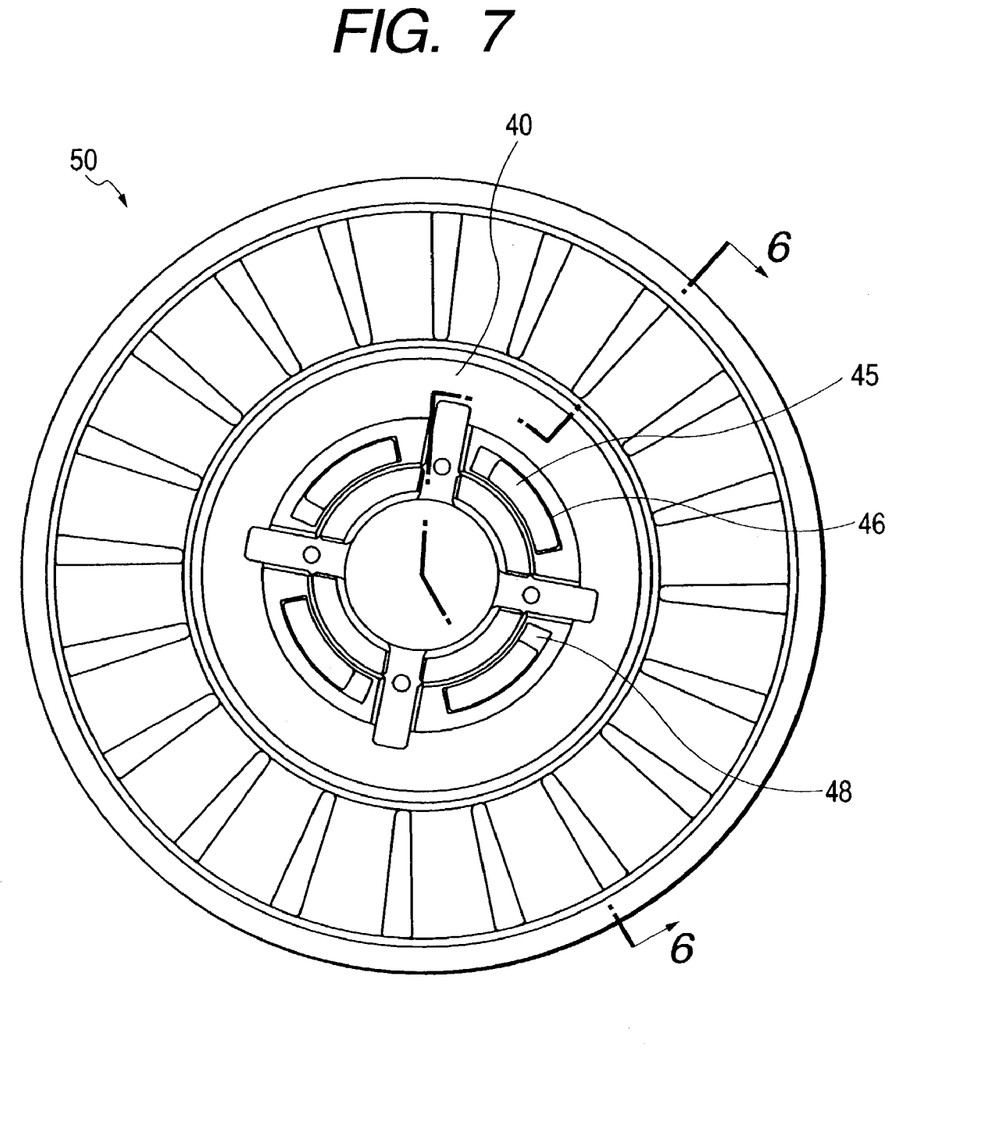
FIG. 7 is a front view illustrating the stator apparatus of FIG. 6.

FIGS. 6 and 7 illustrate a third embodiment of the present invention, and are an axially-sectional view and a front view of a stator apparatus, respectively. FIG. 6 is a cross-sectional view viewed along the line 6—6 in FIG. 7. In the third through fifth embodiments, the one-way clutch assembly is not always a ratchet type, and a one-way clutch using sprags, rollers, or the like as the torque transmitting member can also be employed.

In the third embodiment, an outer race 41 of a stator apparatus 50 includes a plurality of extension portions 46 axially extending to a stator impeller 40. As illustrated in FIG. 7, four extension portions 46 are circumferentially formed at approximately equal angular intervals. A damper spring 47 constituting the damper mechanism is interposed between the relatively-rotatable outer race member 41 and the stator impeller 40. A coil spring is used as the damper spring 47. A torque transmitting member 42 for transmitting torque between the outer race 41 and an inner race 43 is provided therebetween.

The extension portion 46 has an arcuate shape with a predetermined circumferential length. As illustrated in FIG. 7, four through windows 48 are circumferentially formed equidistantly in a radially-inner portion of the stator impeller 40. The number of the windows 48 is equal to that of the extension portions 46. The extension portion 46 passes through the window 48, and protrudes to the opposite side of the impeller 40. Its protruding portion 45 is supported by a needle bearing 44.

As illustrated in FIG. 7, the window 48, through which the arcuate extension portion 46 passes, also has an arcuate shape corresponding to the shape of the extension portion 46. The circumferential length of the window 48 is, however, longer than that of the extension portion 46. The outer race member 41 can rotate relative to the stator impeller 40 within a range of that space between the window 48 and the extension portion 46. In the above structure wherein the needle bearing 44 supports the extension portion 46 of the outer race member 41, the outer race member 41 and the impeller 40 are not be pressed against each other, so that the relative rotation therebetween can be smoothly achieved.

(Fourth Embodiment)

Figure 8:
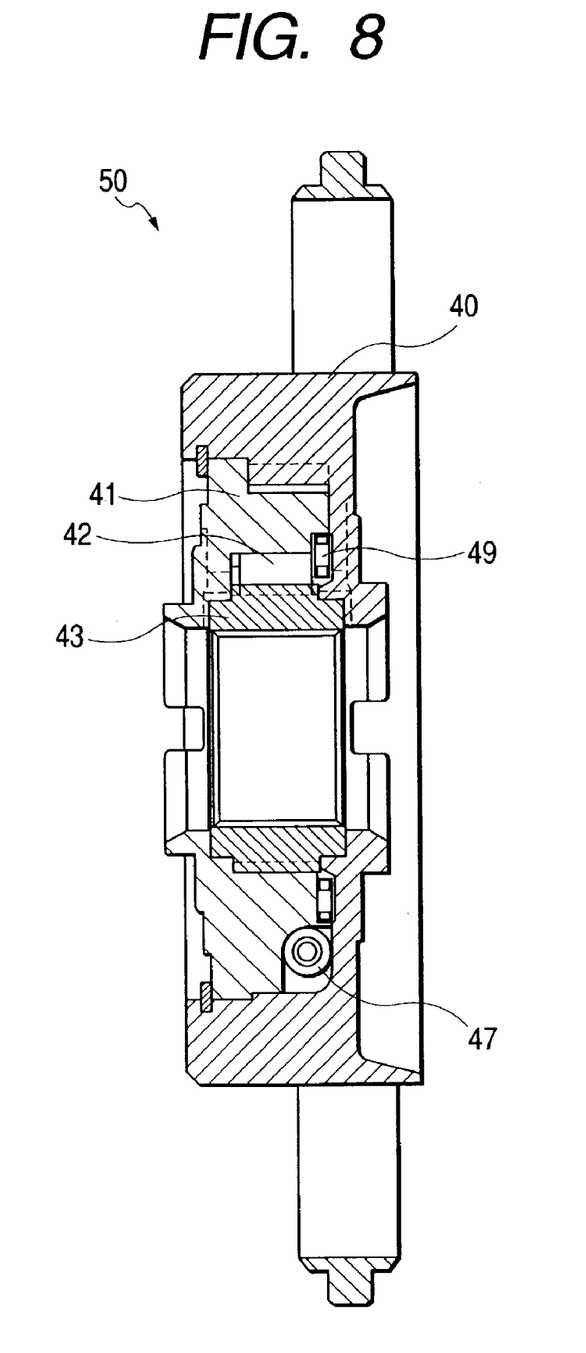
FIG. 8 is an axially-sectional view illustrating a fourth embodiment of the present invention directed to a stator apparatus.

FIG. 8 is an axially-sectional view of a fourth embodiment directed to a stator apparatus. In the fourth embodiment, no extension portion is provided in an outer race member 41. Instead, a needle bearing 49 is interposed between an axially-outer side portion of the outer race member 41 and an axially-inner side portion of a stator impeller 40 which is opposed to the side portion of the outer race member 41. Other structures of this embodiment are substantially the same as those of the third embodiment.

Also in the fourth embodiment, the relative rotation between the outer race member 41 and the stator impeller 40 can be smoothly achieved since the needle bearing 49 is provided therebetween. The needle bearing including a cylindrical rolling member is used in the third and fourth embodiments, but the bearing is not limited thereto. Other rolling bearings in a broad sense, such as a ball bearing, can be used likewise.

In the above-discussed structure, when the damper mechanism operates, the impeller 40 and the outer race member 41 can rotate relative to each other due to the function of the bearing member. Further, there is no need to provide or expand a particular space for the needle bearing 49.

(Fifth Embodiment)

Figure 9:
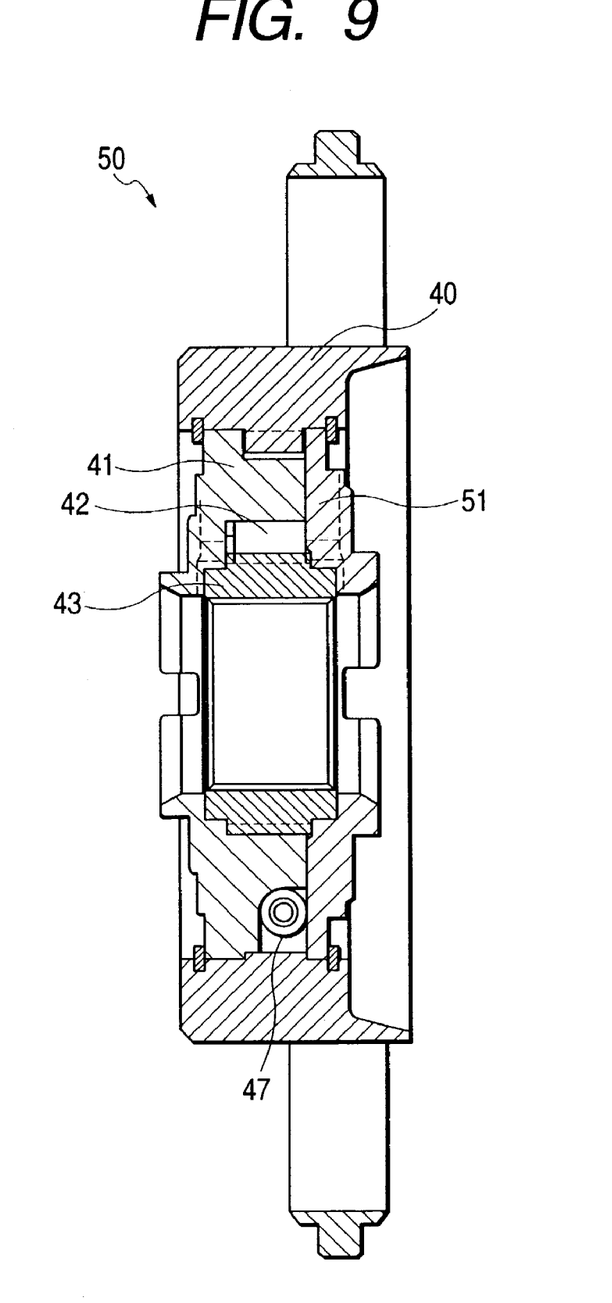
FIG. 9 is an axially-sectional view illustrating a fifth embodiment of the present invention directed to a stator apparatus.

FIG. 9 is an axially-sectional view illustrating a stator apparatus of a fifth embodiment. In the fifth embodiment, no needle bearing is interposed between outer race member 41 and stator impeller 40, different from the third and fourth embodiments. Instead, a radially-inner portion of the stator impeller 40 discussed in the third or fourth embodiment is separated from the body of the impeller 40, and a separate bush 51 is arranged. When the bush 51 is used in place of the bearing in such a manner, the relative rotation between the impeller 40 and the outer race member 41 is not affected by the fluid pressure during operation of the damper mechanism. Accordingly, the operation can be smoothly performed. Also in the third, fourth and fifth embodiments, the outer race member 41 and the stator impeller are made of aluminum.

In each embodiment discussed above, various modifications can be made within the scope of the spirit of the present invention. For example, numbers of the pawls and recesses can be any number other than illustrated ones in the first and second embodiments. Further, in the third embodiment, numbers of the extension portions 46 of the outer race member 41 and the windows 48 of the stator impeller 48 can be appropriately determined according to needs.

As described in the forgoing, the present invention has the following advantages. According to one aspect of the present invention, since the sliding plate is interposed between members constituting the damper mechanism, the relative rotation between these members can be smoothly achieved, and undesired wear due to the sliding between these members and occurrence of wear powder due to the wear can be suppressed. Additionally, the operation of the spring used as the biasing member can be stabilized, and undesired wear due to the rattling of the biasing spring and occurrence of wear powder due to the wear can also be suppressed.

Furthermore, according to another aspect of the present invention, since the bearing or bush is provided between members constituting the damper mechanism to smoothly effect the relative rotation between these members, the operation of the damper mechanism in the stator can be smoothly achieved.

What is claimed is:

1. A ratchet one-way clutch comprising:
   an inner race;
   an outer race provided coaxially with said inner race;
   a pawl member which transmits torque between said inner race and said outer race;
   a damper mechanism which absorbs shock at the time of engagement of said pawl member; and
   a sliding plate interposed between two members which constitute said damper mechanism and are rotatable relative to each other.

2. A ratchet one-way clutch according to claim 1, wherein a protecting member is a piece formed in said sliding plate.

3. A ratchet one-way clutch according to claim 1, wherein said sliding plate has a support portion which supports said pawl member.

4. A stator apparatus comprising a ratchet one-way clutch recited in claim 1.

5. A stator apparatus according to claim 4, wherein said two relatively-rotatable members are an outer race of the ratchet one-way clutch and a stator impeller, respectively.

6. A stator apparatus according to claim 5, wherein said outer race and said stator impeller are formed of aluminum, respectively, and said sliding plate is formed of steel.

7. A ratchet one-way clutch comprising:
   an inner race;
   an outer race provided coaxially with said inner race;
   a torque transmitting member disposed in one of said inner race and said outer race;
   a biasing member which biases said torque transmitting member; and
   a protecting member interposed between said biasing member and said one of said inner race and said outer race, the protecting member having a substantially planar surface portion covering and substantially flush with an end of the biasing member.

8. The ratchet one-way clutch of claim 7, wherein the protecting member has a pair side portions embracing the end of the biasing member.

9. A stator apparatus comprising:
   an outer race member of a one-way clutch assembly;
   a stator wheel rotatable relative to said outer race member, an extension portion extending in an axial direction being formed in one of said outer race member and said stator wheel, a window corresponding to said extension portion being formed in the other of said outer race member and said stator wheel, and said extension portion extending through said window to provide a protruding portion on the side of a side surface of said other of said outer race member and said stator wheel;
   a damper mechanism; and
   a bearing which supports said protruding portion of said extension portion.

10. A stator apparatus according to claim 8, wherein said one-way clutch assembly is a ratchet one-way clutch.

11. A stator apparatus according to claim 8, wherein said outer race member and said stator wheel are formed of aluminum, respectively.

12. A stator apparatus comprising:
   a rotatable outer race member of a one-way clutch assembly;
   a stator wheel; and
   a damper mechanism;
   wherein said stator wheel is rotatable relative to said outer race member during damping by said damper mechanism; and
   wherein a bearing member is interposed between said outer race member and said stator wheel so as to receive axial force between said outer race member and said stator wheel to facilitate the relative rotation of said stator wheel and said outer race during damping by said damper mechanism.

13. A stator apparatus according to claim 12, wherein said bearing member is a rolling bearing.

14. A stator apparatus comprising:
   an outer race member of a one-way clutch assembly;
   a stator wheel rotatable relative to said outer race member;
   a damper mechanism; and a bush arranged adjacent to said outer race member along an axial direction so as to receive axial force between said outer race member and said stator wheel and thereby facilitate the relative rotation of said stator wheel and said outer race member, said stator wheel being disposed on outer peripheries of said outer race member and said bush.

15. A ratchet one-way clutch comprising:

an inner race;

an outer race provided coaxially with said inner race;

a torque transmitting member disposed in one of said inner race and said outer race;

a biasing member for biasing said torque transmitting member; and a protecting member interposed between said biasing member and said one of said inner race and said outer race, wherein the protecting member is substantially U-shaped having a planar base portion substantially flush with the end of the biasing member and a second pair of side portions embracing the end of the biasing member.

* * * * *